(12) United States Patent
Liu et al.

(10) Patent No.: US 11,120,930 B2
(45) Date of Patent: Sep. 14, 2021

(54) METHOD FOR MANUFACTURING HIGH-SENSITIVITY PIEZORESISTIVE SENSOR USING MULTI-LEVEL STRUCTURE DESIGN

(71) Applicant: SOOCHOW UNIVERSITY, Suzhou (CN)

(72) Inventors: Tao Liu, Tallahassee, FL (US); Xiaoshuang Duan, Suzhou (CN); Jiangjiang Luo, Suzhou (CN); Yanbo Yao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 400 days.

(21) Appl. No.: 16/314,820

(22) PCT Filed: Jun. 27, 2018

(86) PCT No.: PCT/CN2018/093045
§ 371 (c)(1),
(2) Date: Jan. 2, 2019

(87) PCT Pub. No.: WO2019/076079
PCT Pub. Date: Apr. 25, 2019

(65) Prior Publication Data
US 2021/0098159 A1 Apr. 1, 2021

(30) Foreign Application Priority Data
Oct. 20, 2017 (CN) .......................... 201710984186.2

(51) Int. Cl.
*H01C 17/28* (2006.01)
*G01D 5/16* (2006.01)
(52) U.S. Cl.
CPC ............... *H01C 17/28* (2013.01); *G01D 5/16* (2013.01)

(58) Field of Classification Search
CPC .................................. H01C 17/28; G01D 5/16
See application file for complete search history.

(56) References Cited

U.S. PATENT DOCUMENTS 8,940,092 B1 * 1/2015 Yeo ........................... C30B 7/00
117/68
9,625,330 B2 * 4/2017 Park ........................ G01L 1/146
(Continued)

FOREIGN PATENT DOCUMENTS

| CN | 106932128 A | 7/2017 |
|---|---|---|
| CN | 107003190 A | 8/2017 |
| CN | 107990918 A | 5/2018 |

*Primary Examiner* — Kyung S Lee
(74) *Attorney, Agent, or Firm* — SZDC Law PC

(57) ABSTRACT

The present invention discloses a method for manufacturing a high-sensitivity piezoresistive sensor using a multi-level structure design, including the following steps: forming first-level basic geometrical units formed of basic structural units on a substrate, where each first-level basic geometrical unit is a two-dimensional or three-dimensional network structure formed by stacking several basic structural units; stacking and combining several first-level basic geometrical units in an array to form a second-level geometrical structure, and forming a contact connection area located between adjacent first-level basic geometrical units; and dispensing a conductive adhesive in at least two positions on the substrate to form electrodes of a piezoresistive sensor, so as to obtain the piezoresistive sensor. A high-sensitivity piezoresistive sensor obtained by using the method of the present invention has flexible design and simple fabrication, can be desirably combined with various existing sensor fabrication methods, and has general applicability.

5 Claims, 4 Drawing Sheets

(56) References Cited

U.S. PATENT DOCUMENTS

| | | | | |
|---|---|---|---|---|
| 2012/0302044 A1* | 11/2012 | Haag | ............... | H01M 4/463 |
| | | | | 438/478 |
| 2014/0260653 A1* | 9/2014 | Merrell | ............. | H01L 41/183 |
| | | | | 73/774 |
| 2015/0059486 A1* | 3/2015 | Choong | ............. | G01L 9/0052 |
| | | | | 73/727 |
| 2016/0011063 A1* | 1/2016 | Zhang | ............. | A61B 34/30 |
| | | | | 600/301 |
| 2016/0062463 A1* | 3/2016 | Liu | ............. | G06F 3/0414 |
| | | | | 345/173 |
| 2016/0153762 A1 | 6/2016 | Li et al. | | |
| 2017/0016875 A1* | 1/2017 | Parker | ............. | A61B 5/053 |
| 2017/0081199 A1* | 3/2017 | Haag | ............. | B22F 9/28 |
| 2017/0102334 A1* | 4/2017 | Zaretski | ............. | C23C 16/0227 |
| 2017/0354372 A1* | 12/2017 | Varadan | ............. | A61B 5/25 |
| 2017/0363489 A1* | 12/2017 | Haick | ............. | G01L 1/18 |
| 2018/0073943 A1* | 3/2018 | Zeng | ............. | G01L 1/18 |
| 2019/0056246 A1* | 2/2019 | Lee | ............. | G01D 5/30 |
| 2019/0328328 A1* | 10/2019 | Haick | ............. | A61B 5/021 |

\* cited by examiner

METHOD FOR MANUFACTURING HIGH-SENSITIVITY PIEZORESISTIVE SENSOR USING MULTI-LEVEL STRUCTURE DESIGN

This application is the National Stage Application of PCT/CN2018/093045, filed on Jun. 27, 2018, which claims priority to Chinese Patent Application No.: 201710984186.2, filed on Oct. 20, 2017, which is incorporated by reference for all purposes as if fully set forth herein.

FIELD OF THE INVENTION

The present invention relates to the field of piezoresistive sensor technologies, and in particular, to a method for manufacturing a high-sensitivity piezoresistive sensor using a multi-level structure design.

BACKGROUND OF THE INVENTION

A piezoresistive sensor is a sensor that converts a change in force into an electrical signal output through a characteristic that the resistance of a piezoresistive material changes under the effect of a stress. Piezoresistive sensors may be widely applied to measurement and control of a pressure, a tensile force, a pressure difference, and other physical quantities that can be transformed into a change in force (for example, a liquid level, an acceleration, a weight, a strain, a flow, a degree of vacuum). Piezoresistive sensors can be made from metal and metal oxides, semiconductor materials, carbon materials, and the like. Currently, commercially available piezoresistive sensors mainly include a metal type and a silicon type. Gauge factor (GF) is a key indicator for describing sensor performance and is defined as a relative change amount of resistance/strain (GF=$(\Delta R/R)/\varepsilon$).

A conventional metal strain sheet has relatively low sensitivity, and the piezoresistive gauge factor is only 1 to 2, the gauge factor of a polycrystalline silicon material is approximately 50, the gauge factor of a monocrystalline silicon material is approximately 200. There are generally two types of methods for increasing sensitivity. In one type of method, a new material that has an intrinsic electronic band structure highly sensitive to a stress/strain change is manufactured or used, such as a semiconductor material silicon that has piezoresistive performance. The sensitivity of a piezoresistive material can also be increased by reducing the size of the piezoresistive material to a micrometer level or even a nanometer level. Such piezoresistive materials are, for example, a monocrystalline slice of CdS (GF~2970), p-GaN (GF~260), a single silicon nanowire (GF~6000) or a carbon nanotube (GF~200 to 2900). In the other type of method, a heterogeneous structure is generated to form a granular substance or composite material. High sensitivity is mainly produced from a change in resistance and tunneling resistance caused when basic structural units are disconnected or come into contact under the effect of a stress/strain. The basic structural units may be various metal nanoparticles, carbon nanomaterials, composite nanoparticles composed of metal and carbon nanotubes. For example, in a piezoresistive sensor that uses polydimethoxysiloxane for a substrate and uses carbon nanotubes for a sensitive element, the basic structural units are carbon nanotubes. Under a stress/strain, the carbon nanotubes and carbon nanotube bundles come into contact or are disconnected between each other, so as to achieve high sensitivity. The sensitivity of the sensor may reach 2000 when platinum nanoparticles are deposited and nanofractures are manufactured.

Among existing commercially available sensors, a conventional metal-based piezoresistive sensor has relatively low sensitivity, and the sensitivity of a silicon-based piezoresistive sensor is higher than that of a sensor using a metal substrate. However, a processing requirement of the silicon-based piezoresistive sensor is high, and device costs are high. A person skilled in the art aims to further improve the sensitivity of a piezoresistive sensor.

SUMMARY OF THE INVENTION

The objective of the present invention is to provide a method for manufacturing a high-sensitivity piezoresistive sensor using a multi-level structure design. A high-sensitivity piezoresistive sensor obtained by using the method has the advantages such as flexible design and simple fabrication, can be desirably combined with various existing sensor fabrication methods, and has general applicability.

To achieve the foregoing objective, the technical solution used in the present invention is a method for manufacturing a high-sensitivity piezoresistive sensor using a multi-level structure design, including the following steps:

Step 1: forming first-level basic geometrical units formed of basic structural units on a substrate first, where each first-level basic geometrical unit is a two-dimensional or three-dimensional network structure formed by stacking several basic structural units, and the basic structural units are carbon/graphite nanoparticles, metal nanoparticles or semiconductor nanoparticles;

Step 2: stacking and combining several first-level basic geometrical units in an array to form a second-level geometrical structure, and forming a contact connection area located between adjacent first-level basic geometrical units, where the contact connection area between the basic geometrical units is formed of several basic structural units, and strength of connection of the contact connection area is adjusted by an arrangement quantity and an arrangement manner of the basic structural units in the contact connection area; and Step 3: dispensing a conductive adhesive in at least two different positions on the substrate to form electrodes of a piezoresistive sensor, so as to obtain the piezoresistive sensor.

Further improved solutions of the foregoing technical solution are as follows:

1. In the foregoing solution, methods for fabricating the basic structural units and basic geometrical units are photolithography, soft etching, printing, spraying or in situ growth.

2. In the foregoing solution, a method for fabricating the basic structural units and basic geometrical units is laser writing.

3. In the foregoing solution, the substrate is a polyimide film having a film thickness between 10 μm and 2000 μm, where a preferred film thickness is between 100 μm and 150 μm.

Since the foregoing technical solution is applied, the present invention has the following advantages and effects as compared with the prior art:

In the method for manufacturing a high-sensitivity piezoresistive sensor using a multi-level structure design according to the present invention, patterns of basic geometrical unit structures are designed to adjust contact structures of basic structural units between basic geometrical units, which has the advantages of flexible design and simple fabrication. The method can be desirably combined with various existing sensor fabrication methods, and has general applicability. The obtained sensor has ultra-high sensitivity. Under the guidance of a solution of a multi-level contact structure design, a graphite piezoresistive sensor is obtained through laser writing on polyimide. A piezoresistive sensor in which four different patterns are designed implements the design of a multi-level contact structure, so that piezoresistive sensors having different sensitivity are obtained flexibly, and the sensitivity is between 1 and 10000.

BRIEF DESCRIPTION OF THE DRAWINGS

FIG. 1-2 shows an SEM image 2 of the piezoresistive sensor obtained by using the method provided in Embodiment 1 of the present invention;

FIG. 2-1 shows an SEM image 1 of a piezoresistive sensor obtained by using a method provided in Embodiment 2 of the present invention;

FIG. 2-2 shows an SEM image 2 of the piezoresistive sensor obtained by using the method provided in Embodiment 2 of the present invention;

FIG. 3-1 shows an SEM image 1 of a piezoresistive sensor obtained by using a method provided in Embodiment 3 of the present invention;

FIG. 3-2 is a diagram showing that a strain applied on the piezoresistive sensor obtained in Embodiment 3 of the present invention changes with time;

FIG. 3-3 is a diagram showing changes of resistance of the piezoresistive sensor obtained in Embodiment 3 of the present invention under periodic strains.

DETAILED DESCRIPTION OF THE EMBODIMENTS

Figure 1:
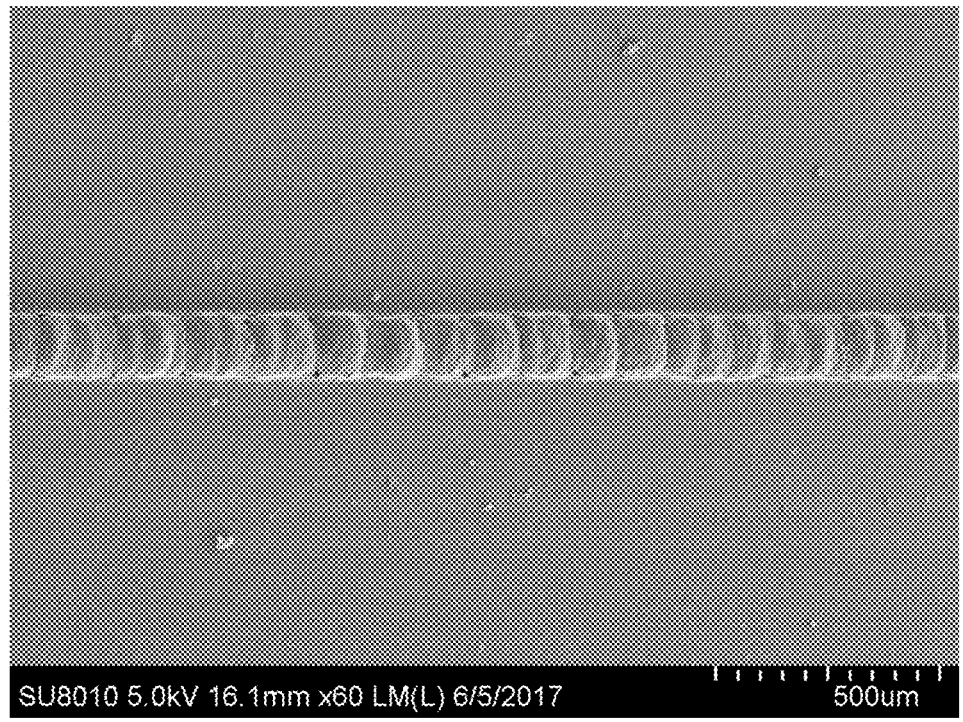
FIG. 1-1 shows an SEM image 1 of a piezoresistive sensor obtained by using a method provided in Embodiment 1 of the present invention.

The present invention is further described below with reference to the embodiments:

A method for manufacturing a high-sensitivity piezoresistive sensor using a multi-level structure design includes the following steps:

Step 1: forming first-level basic geometrical units formed of basic structural units on a substrate first, where each first-level basic geometrical unit is a two-dimensional or three-dimensional network structure formed by stacking several basic structural units, and the basic structural units are carbon/graphite nanoparticles, metal nanoparticles or semiconductor nanoparticles;

Step 2: stacking and combining several first-level basic geometrical units in an array to form a second-level geometrical structure, and forming a contact connection area located between adjacent first-level basic geometrical units, where the contact connection area between the basic geometrical units is formed of several basic structural units, and strength of connection of the contact connection area is adjusted by an arrangement quantity and an arrangement manner of the basic structural units in the contact connection area; and Step 3: dispensing a conductive adhesive in at least two positions on the substrate to form electrodes of a piezoresistive sensor, so as to obtain the piezoresistive sensor.

Methods for fabricating the basic structural units and basic geometrical units are photolithography, soft etching, printing, spraying or in situ growth.

A method for fabricating the basic structural units and basic geometrical units is laser writing.

The substrate is a polyimide film having a film thickness between 10 μm and 2000 μm, where a preferred film thickness is between 100 μm and 150 μm.

Embodiment 1: In a method for manufacturing a high-sensitivity piezoresistive sensor using a multi-level structure design, a method of multi-level contact design of the present invention is used to fabricate first a simplest contact form, which is linear patterns carbonized by laser with only stacking and contact between basic structural units.

A single dot obtained in a dotting mode is a basic geometrical unit formed by stacking basic structural units. Therefore, a dot line pattern has stacking of basic geometrical units and is a contact structure that is one level higher than a mere straight-line pattern. An overlapping portion between basic geometrical units undergoes laser energy twice, and therefore, basic structural units of the overlapping portion are weaker than those elsewhere, and come into contact or are disconnected more easily under the effect of an external force. Therefore, the sensitivity is high. A specific implementation is as follows:

(1): A polyimide film purchased from the DuPont Company is used, and the film has a thickness of 125 μm. A straight-line pattern having a length of 12 mm is drawn on laser operation software.

(2): Laser parameters are set: A laser mode is a laser cutting mode. A cutting speed is 15 mm/s. A laser power is 8%.

(3): A laser position is adjusted to perform in-situ carbonization on the film to generate a carbon material.

(4): A silver adhesive is dispensed at two ends of a straight line to form electrodes to manufacture a piezoresistive sensor, as shown in FIG. 1-1.

(5): DMA is used to perform a tensile test, and resistance changes of the piezoresistive sensor are recorded at the same time. The eventually measured sensitivity is approximately 500.

Figures 1, 2:
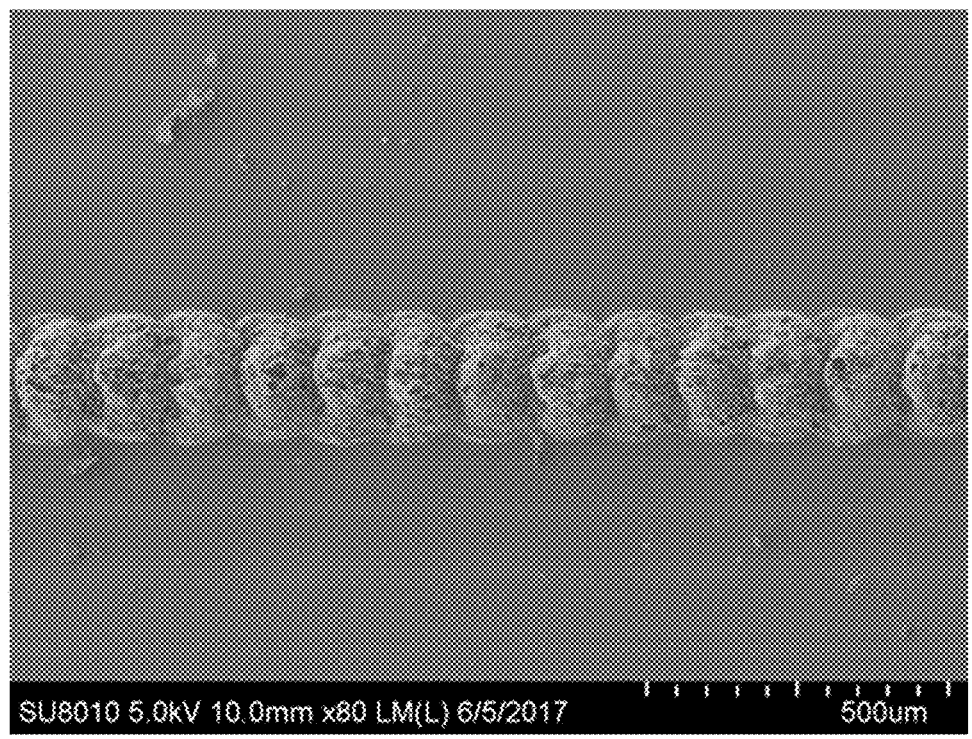
Figures 1, 2:
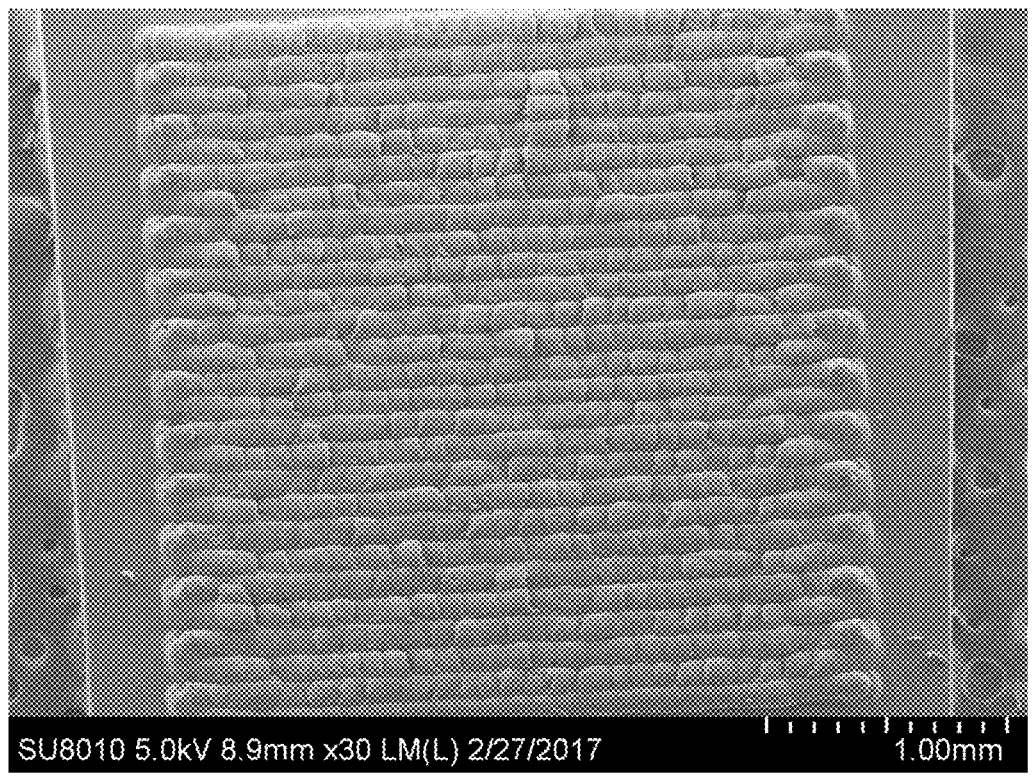
Figure 2:
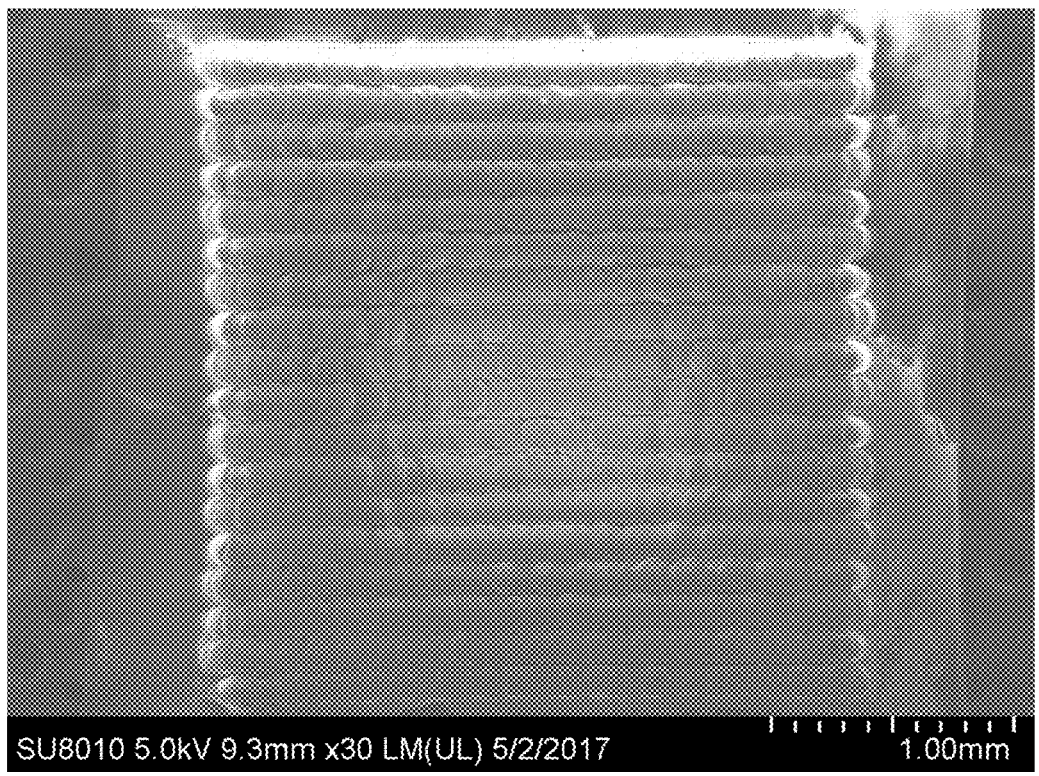

The parameters are changed. The laser mode is a dotting mode. A laser speed is 15 mm/s. The laser power is 8%. A dotting time is 0.025 S, and a dotting interval is 0.15 mm. Other conditions are kept unchanged. The sensitivity of the manufactured sensor may reach 100, as shown in FIG. 1-2.

Embodiment 2: In a method for manufacturing a high-sensitivity piezoresistive sensor using a multi-level structure design, a structure in which basic structural units are stacked or contact is upgraded to a structure in which basic geometrical units are stacked. Next, a contact structure between the basic geometrical units may be designed. According to this method, when contact between basic geometrical units is weaker, the sensitivity is higher. In addition, a stacking status of basic structural units may be adjusted by changing laser energy. A specific implementation is as follows:

(1): A polyimide film purchased from the DuPont Company is used, and the film has a thickness of 125 μm. A 30 mm*30 mm rectangle is drawn on laser operation software.

(2): Laser parameters are set: A laser mode is a scan mode. A scan speed is 100 mm/s. A laser power is 37.5%. A scan interval is 150 mm.

(3): A laser position is adjusted to perform in-situ carbonization on the film to generate a carbon material.

(4): A silver adhesive is dispensed at four corners of the rectangle to form electrodes to manufacture a piezoresistive sensor, as shown in FIG. 2-1.

(5): DMA is used to perform a tensile test, and resistance changes of the piezoresistive sensor are recorded at the same time. The eventually measured sensitivity is approximately 100.

The parameters are changed. The scan interval is 180 mm. Other conditions are kept unchanged. The sensitivity of the manufactured sensor may reach 300, as shown in FIG. 2-2. If the scan interval of 180 mm is kept unchanged, the laser power is changed to 8%, and the scan speed is changed to 15 mm/s, the sensitivity of the sensor may reach 1000.

Embodiment 3: In a method for manufacturing a high-sensitivity piezoresistive sensor using a multi-level structure design, dot contact in the method is weaker than line contact. Therefore, a stacking structure of dot contact between basic geometrical structures is designed. A dot formed by stacking basic structural units is a first-level basic geometrical unit. A circle formed by arranging dot basic geometrical units is considered as a second-level basic geometrical unit. The second-level basic geometrical units are arranged in an array to form a surface, so as to form a surface-type pattern. In this pattern, first-level contact between basic geometrical units exists in the circle. Contact between circles is contact between the second-level basic geometrical units. Therefore, a multi-level contact structure is implemented. In this structure, dot contact makes contact portions relatively weak, and the contact portions are disconnected or come into contact easily under the influence of a stress/strain. A multi-level structure increases the quantity of contact points, and a chance that contact points are disconnected or come into contact under a stress/strain becomes higher. Therefore, the multi-level contact design may greatly improve the sensitivity of sensors, and a specific implementation is as follows:

(1): A polyimide film purchased from the DuPont Company is used, and the film has a thickness of 125 μm. Circles having a diameter of 0.5 mm and 5*5 arrays having an array interval of 0.1 mm are drawn on operation software.

(2): Laser parameters are set: A laser dotting mode is used. A laser power is 8%. A dotting interval is 150 mm. A dotting time is 0.013 s.

(3): A laser position is adjusted to perform in-situ carbonization on the film to generate a carbon material.

Figures 1, 3:
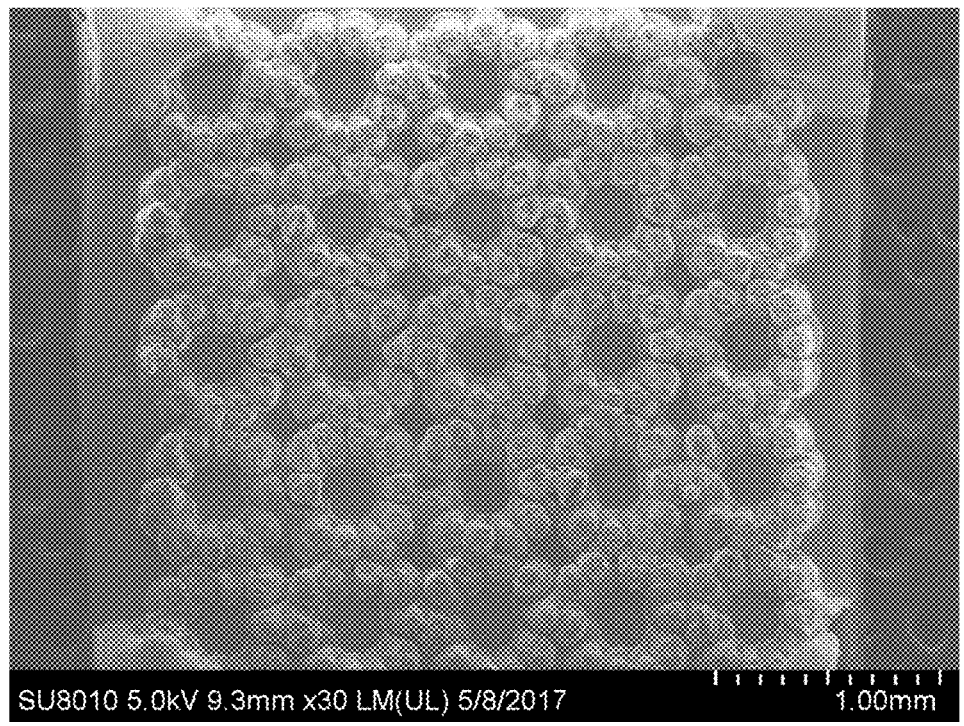
Figures 2, 3:
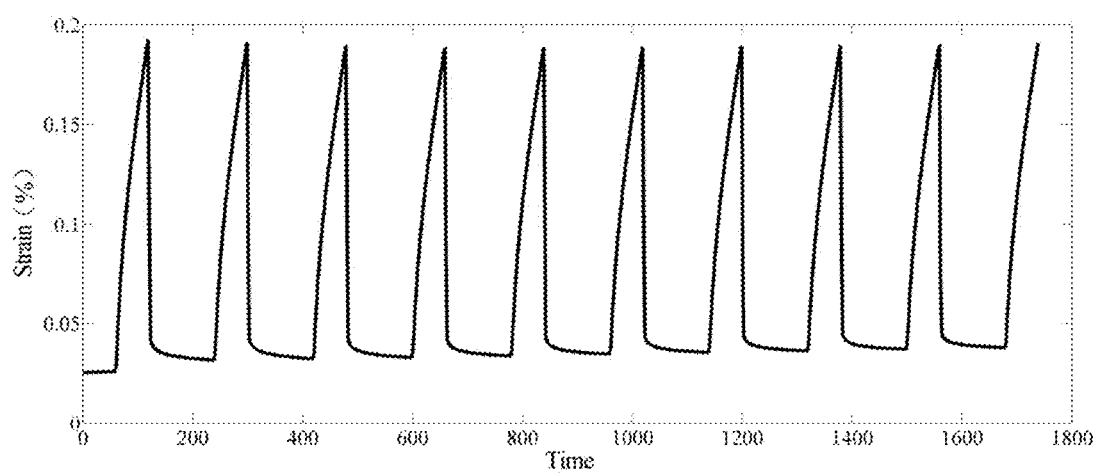
Figure 3:
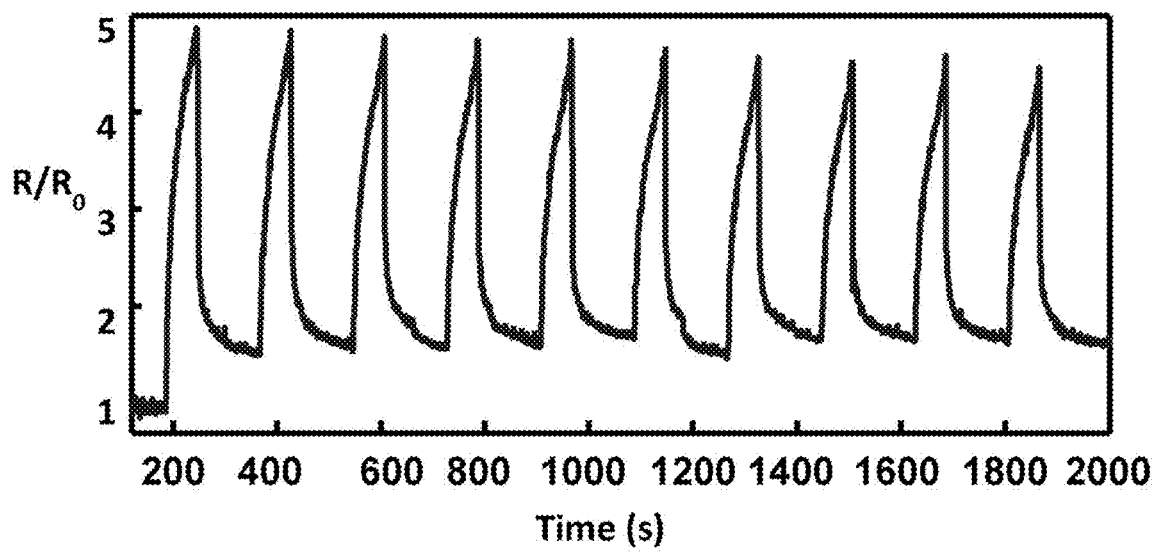

(4): A silver adhesive is dispensed at four corners of the pattern to form electrodes to manufacture a piezoresistive sensor, as shown in FIG. 3-1.

(5): DMA is used to perform a tensile test, and resistance changes of the piezoresistive sensor are recorded at the same time. The eventually measured sensitivity is approximately 500.

The dotting time is changed to 0.025 s. Other conditions are kept unchanged. The sensitivity of the manufactured sensor may reach 1500. Resistance responses of the sensor when a strain is applied is as follows.

Figure 4:
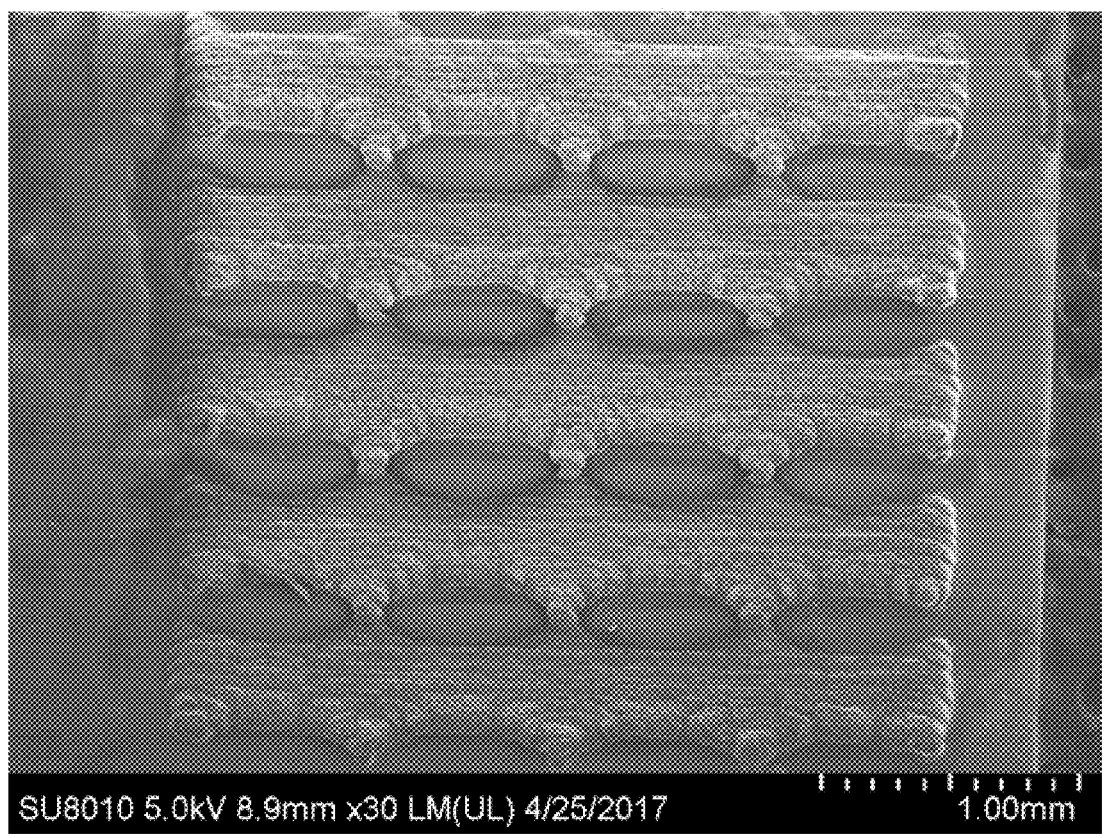
FIG. 4 shows an SEM image of a piezoresistive sensor obtained by using a method in Embodiment 4 of the present invention.

Embodiment 4: In a method for manufacturing a high-sensitivity piezoresistive sensor using a multi-level structure design, a polyimide film purchased from the DuPont Company is used, and the film has a thickness of 125 μm. A pattern in FIG. 4 is drawn on operation software. Elliptical portions are uncarbonized regions. By using a modulus difference between a carbonized region and an uncarbonized region, a stress concentration region may be formed when the film is stretched, so that contact portions are disconnected or come into contact easily, so that the sensitivity of the sensor is increased. If the condition is a laser scan, a laser power is 8%, a scan speed is 15 mm/s, and a scan interval is 0.05 mm, the sensitivity of the sensor may reach 4000.

Embodiment 5: In a method for manufacturing a high-sensitivity piezoresistive sensor using a multi-level structure design, a multi-level contact piezoresistive sensor manufactured by using laser writing may be further used for detection of a high frequency signal. Signals of water-bath ultrasound and probe ultrasound are monitored for presentation. A circle-circle multi-level contact pattern sensor designed by using this method is bonded at the bottom of a plastic sample box. The sample box is placed in water. At the same time when ultrasound is turned on, an oscilloscope is used to collect resistance changes. Results show that the signal amplitude of water-bath ultrasound is smaller than that of probe ultrasound, indicating that the water-bath ultrasound has lower power. By performing fast Fourier transform on collected data, it is obtained that the frequency of a water-bath ultrasound device is 20.07 KHz and the frequency of a probe ultrasound device is 33.4 KHz.

Embodiment 6: In a method for manufacturing a high-sensitivity piezoresistive sensor using a multi-level structure design, a pressure test is performed at the same time on a commercially available metal strain sheet and a multi-level contact piezoresistive sensor designed by using this method. The two sensors are separately bonded on steel frames having a cantilever beam structure. The sensors are placed in parallel. A pressure of 0.125 MPa is applied at the same time, and resistance changes of the two sensors are recorded. After a number of times of cyclic tests, the piezoresistive sensor has stable changes and manifests desirable stability. The metal strain sheet has a change amount of 0.1%, and the piezoresistive sensor has a change amount of 500%. The sensitivity of the commercially available metal strain sheet is approximately 2. By using this as a reference, the sensitivity of the multi-level contact piezoresistive sensor reaches 10000.

By using the foregoing method for manufacturing a high-sensitivity piezoresistive sensor using a multi-level structure design, pattern designs of basic geometrical unit structures are used to adjust contact structures of basic structural units between basic geometrical units, so as to obtain flexible design and simple fabrication. The method can be desirably combined with various existing sensor fabrication methods, and has general applicability. The obtained sensor has ultra-high sensitivity. Under the guidance of a solution of a multi-level contact structure design, a graphite piezoresistive sensor is obtained through laser writing of polyimide. A piezoresistive sensor in which four different patterns are designed implements the design of a multi-level contact structure, so that piezoresistive sensors having different sensitivity are obtained flexibly, and the sensitivity is between 1 and 10000.

The foregoing embodiments are merely used to describe the technical concept and characteristics of the present invention, and the objective of the embodiments is to enable persons skilled in the art to understand the content of the present invention and achieve implementation accordingly, but the embodiments cannot be used to limit the protection scope of the present invention. Any equivalent changes or modifications made according to the spirit and essence of the present invention shall fall within the protection scope of the present invention.

What is claimed is:

1. A method for manufacturing a high-sensitivity piezoresistive sensor using a multi-level structure design, comprising the following steps:

Step 1: forming first-level basic geometrical units formed of basic structural units on a substrate first, wherein each first-level basic geometrical unit is a two-dimensional or three-dimensional network structure formed by stacking several basic structural units, and the basic structural units are carbon/graphite nanoparticles, metal nanoparticles or semiconductor nanoparticles;

Step 2: stacking and combining several first-level basic geometrical units in an array to form a second-level geometrical structure, and forming a contact connection area located between adjacent first-level basic geometrical units, wherein the contact connection area between the basic geometrical units is formed of several basic structural units, and strength of connection of the contact connection area is adjusted by an arrangement quantity and an arrangement manner of the basic structural units in the contact connection area to obtain a flexible design and simple fabrication; and Step 3: dispensing a conductive adhesive in at least two positions on the substrate to form electrodes of a piezoresistive sensor, so as to obtain the piezoresistive sensor.

2. The method for manufacturing a high-sensitivity piezoresistive sensor using a multi-level structure design according to claim 1, wherein a method for fabricating the basic structural units and basic geometrical units is photolithography, soft etching, printing, spraying or in situ growth.

3. The method for manufacturing a high-sensitivity piezoresistive sensor using a multi-level structure design according to claim 1, wherein a method for fabricating the basic structural units and basic geometrical units is laser writing.

4. The method for manufacturing a high-sensitivity piezoresistive sensor using a multi-level structure design according to claim 1, wherein the substrate is a polyimide film having a film thickness between 10 μm and 2000 μm.

5. The method for manufacturing a high-sensitivity piezoresistive sensor using a multi-level structure design according to claim 4, wherein the substrate is a polyimide film having a thickness between 100 μm and 150 μm.

\* \* \* \* \*